United States Patent [19]

Delligatii et al.

[11] Patent Number: 4,542,386
[45] Date of Patent: Sep. 17, 1985

[54] INK JET PRINTING SYSTEM

[75] Inventors: Patrick Delligatii; Hans F. Steen, both of Tom's River, N.J.

[73] Assignee: Dalemark Industries, Inc., Lakewood, N.J.

[21] Appl. No.: 441,761

[22] Filed: Nov. 15, 1982

[51] Int. Cl.$^4$ ............................................. G01D 15/18
[52] U.S. Cl. .............................. 346/140 R; 346/140 R
[58] Field of Search ..................... 346/140 R, 75, 76 L

[56] References Cited

U.S. PATENT DOCUMENTS

| | | | |
|---|---|---|---|
| 4,080,608 | 3/1978 | Stoneburner et al. | 346/75 |
| 4,367,480 | 1/1983 | Kotoh | 346/140 R |
| 4,375,066 | 2/1983 | Herd | 346/140 R |

OTHER PUBLICATIONS

*Techni-Tool*, Catalog No. 25, pp. 168 and 169, 1981.

*Primary Examiner*—E. A. Goldberg
*Assistant Examiner*—Gerald E. Preston
*Attorney, Agent, or Firm*—Sixbey, Friedman & Leedom

[57] ABSTRACT

An ink jet printing system including a lower cabinet in which is supported ink and solvent supplies, an upper cabinet in which is supported a microprocessor based controller and a remote ink jet printing head connected with the lower cabinet through a flexible cable which supplies ink, solvent and electrical control signals to the head. A proximity sensor may be mounted on the head to supply sense signals to the controller. A nozzle assembly including critically dimensioned, linearly arranged ink jet orifices is mounted in a predetermined relationship with a U-shaped pattern of control valves to allow the supply passageways linking the control valves and orifices to be substantially identical in shape and ink flow characteristics. Ink reservoirs adjacent each ink jet orifice combine with the uniform supply passageways to provide highly controllable ink jet discharge droplets dependent upon the opening time of each control valve.

6 Claims, 10 Drawing Figures

INK JET PRINTING SYSTEM

TECHNICAL FIELD

This invention relates to an ink jet printing system for forming desired patterns, such as coding information, on a printing surface, such as the side of a package which may be transported along a conveyor run.

BACKGROUND ART

In recent years, a technological explosion has occurred in the ink jet printing art which has substantially advanced the quality of resultant printed images. However, such systems have remained generally bulky and immobile, thereby reducing the range of tasks open to them. Furthermore, their physical construction is such that they do not allow their operators to be conveniently stationed with regard to ink and solvent supplies and the supervising control apparatus so that they may respond immediately to problems or changes in the printing process. Efforts have been made to introduce systems which are physically more flexible, such as the large, partially mobile system disclosed in U.S. Pat. No. 4,283,731 and the multiple component system disclosed in U.S. Pat. No. 3,913,719, but a compact, fully self-contained and mobile system has not yet been introduced.

The flexibility and efficiency of current systems has been further enhanced by the introduction of microprocessors which are used to control and change type sizes and font styles while printing at extremely high speeds. Microprocessors may also be employed in systems used to print code information on moving packages by responding to a signal produced by a package sensor to cause the code information to be properly positioned on the package such as illustrated in U.S. Pat. No. 4,283,731. In addition to the control features mentioned above, microprocessors may also regulate such technical aspects of the ink jet printing head, as the timing of signal pulses sent to each of several solenoid valve units instructing them when and how long to open so as to simultaneously deliver the proper amount of ink to each of several nozzles contained in the head for deposit on a printing surface. This type of system is shown in U.S. Pat. No. 4,215,350 where a number of solenoid valves are controlled by a pattern generator which regulates the height of printed characters by sending pulses to one of two groups of solenoid valves causing the appropriate valves in that group to open simultaneously. The problem which arises is that the ink in such systems must travel different distances to the proper nozzle. Therefore, it is difficult to maintain uniform pressure at each nozzle head, and, when the pressure is not uniform, the ink droplets deposited by each nozzle may vary in size, reducing the quality of printing obtainable from the system. An attempt to improve uniformity is illustrated by U.S. Pat. No. 4,284,993 in which an ink pressure equalization pipe is used but this patent does not address the problem of obtaining uniformity in a system employing solenoid valves for forming ink jet droplets from stationary discharge orifices.

The efficiency and economy of these high speed systems is further adversely effected by difficulties encountered in manufacturing adequate nozzle heads. The small size of nozzles and the nozzle orifices make them difficult to manufacture reproducibly and also makes the identification of sources of variable performance difficult to diagnose. One effort to overcome these problems is disclosed in U.S. Pat. No. 4,282,533 in which a unitary metallic nozzle member is used to provide strength, fluid flow properties and to control pressure drop across the orifices. However, the high cost of manufacturing nozzles to close tolerances remains, as do the uniform pressure problems mentioned above.

Other known features in ink jet printing systems include multiple filter systems for ensuring a supply of clean ink and solvent (U.S. Pat. No. 4,153,902); automatic, three-way, valve-controlled devices for cleaning ink jet heads with solvent (U.S. Pat. No. 4,296,418); and the addition of an ink reservoir to a nozzle for improving system start-up performance (U.S. Pat. No. 4,187,512). However, none of these references discloses a fully, mobile, self-contained ink jet printing system which overcomes the problems noted above.

DISCLOSURE OF THE INVENTION

It is the primary object of the subject invention to overcome the deficiencies of the prior art by providing an ink jet printing system including a two-part mobile housing having a lower cabinet containing a storage tank for ink and solvent and an air pump to pressurize the ink and solvent tanks and an upper cabinet which is removably mounted on the lower cabinet and contains electrical operator controls. This system permits remote positioning of an ink head so as to maximize the variety of ink jet systems applications to which it may be adapted.

A further object of the invention is to provide a multi-component ink jet printing system having conduits which extend between a two-part housing containing ink and solvent supplies, as well as control equipment, to a remote printing head.

Yet another object of this invention is to provide an ink jet discharge head for use in an ink jet printing system which contains plural solenoid control valves that are mounted on a U-shaped base. Two of the valves are mounted on each leg of the U-shaped support, and the remaining valves are mounted on the cross-member of the support. Ink flow passageways of substantially equal length link the valves to corresponding ink jet orifices to cause ink jet droplets of identical mark forming characteristics to be discharged from the ink jet orifices at a predetermined lag time following receipt of activating signals by the linked control valves such that the lag time between receipt of the activating signal by a control valve and the discharge of an ink droplet by a linked ink jet orifice is the same for each linked control valve and ink jet orifice.

Another object of this invention is to provide an ink jet discharge head which includes a supply manifold containing an internal longitudinal cavity. The supply manifold is positioned between the legs of a U-shaped support on which are mounted plural control valves. The manifold contains a corresponding number of supply passages which extend from the interior of the cavity to the exterior of the supply manifold and are aligned radially toward a corresponding control valve.

It is still another object of this invention to provide a nozzle assembly for use in an ink jet printing head which contains a number of nozzle cavities and channels which terminate at one end in each nozzle cavity. Within each cavity, a plug is mounted which seals the cavity. The plug contains an orifice for forming an ink jet from ink which is supplied to it from a corresponding channel.

Still another object of this invention is to provide a nozzle assembly for an ink jet printing system in which an ink reservoir is formed in the space remaining when a jet orifice containing plug is inserted into the outer end of a cavity in the nozzle assembly. The volumes of the respective ink reservoirs are substantially greater than the volumes of the corresponding ink jet orifices to stabilize the size and mark forming characteristics of the ink jet droplets emitted from the corresponding ink jet orifices.

Other and more specific objects of the invention may be understood from the following Brief Description of the Drawings and Best Mode for Carrying Out the Invention.

BEST MODE FOR CARRYING OUT THE INVENTION

Figure 1:
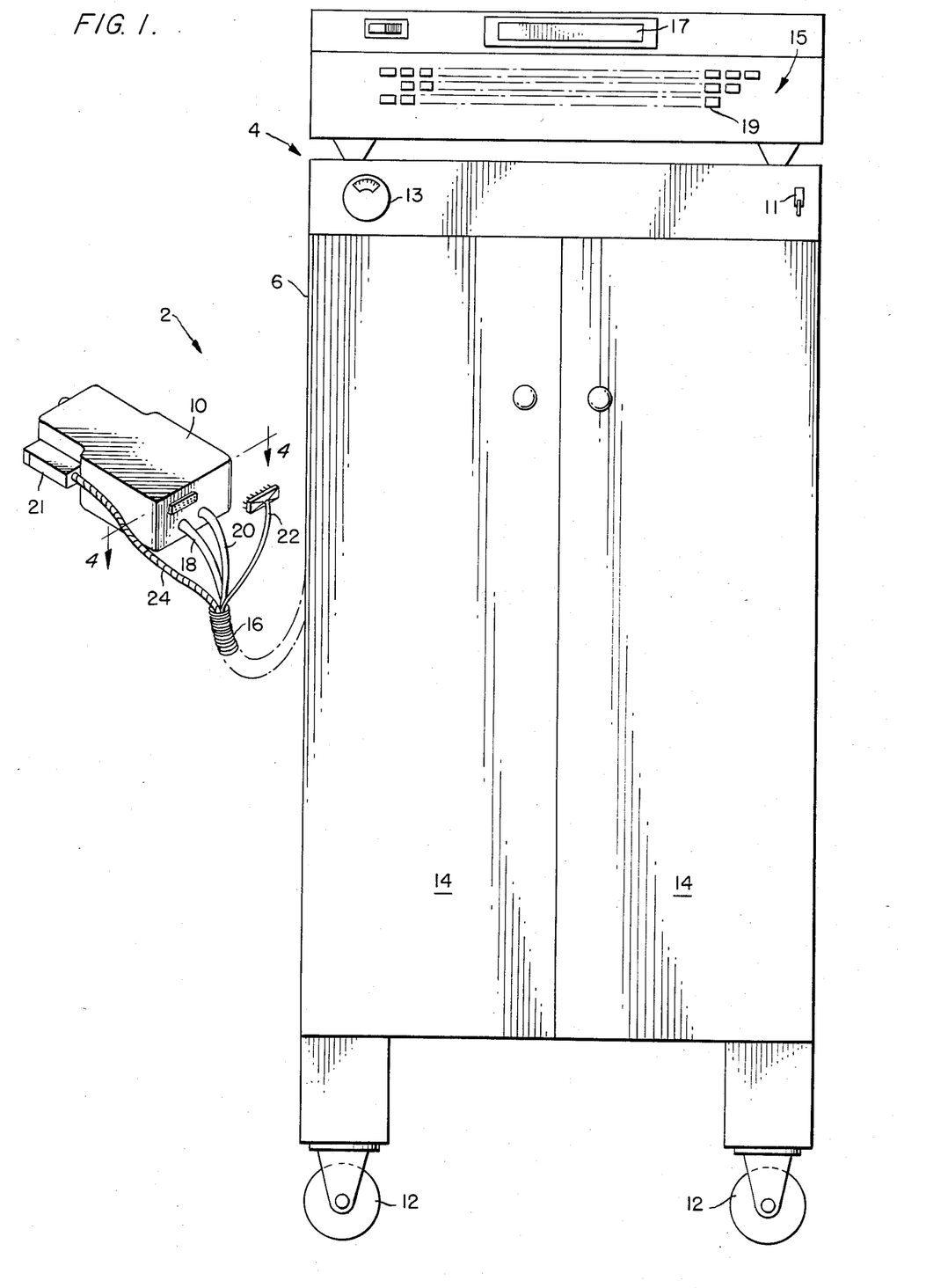
FIG. 1 is a combined front elevational view and perspective view of an ink jet printer system designed in accordance with the subject invention.

For a clear understanding of the subject invention, reference is initially made to FIG. 1 in which the ink jet printing system 2 designed in accordance with the subject invention is illustrated. In particular, this system includes a mobile housing 4 comprised of a lower cabinet 6, an upper cabinet 8 and a unitary ink jet discharge or printing head 10. The lower cabinet 6 is supported by swivel caster wheels 12 and includes a pair of cabinet doors 14 to provide easy access to the system components mounted within. As will be described more fully below, lower cabinet 6 is designed to retain all of the high bulk, high weight system components such as the ink and solvent supply tanks and fluid pressurizing pump. This arrangement provides the distinct advantages of placing all of the system components which might have an adverse effect on the more delicate control equipment in a compartment which is entirely separate from the electronic control component equipment which will be described below. In particular, the head generated by the pump or the corrosive effect of the fluids used in the system can be more easily isolated from the control equipment by mounting the equipment in an entirely separate cabinet. Moreover, by placing the higher weight components in the lower cabinet, the overall housing structure is given a lower center of gravity to provide a more stable and more easily maneuvered system. The lower housing includes a power switch 11 and a supply pressure gauge 13 which will be described more fully below.

The upper cabinet 8 is designed to house the control means including a programmed microprocessor (not illustrated) into which pattern generating data may be fed for storage and use by the microprocessor to generate electrical control signals for controlling the operation of ink jet discharge head 10. Upper cabinet 8 also includes operator input means 15 including a display 17 and keyboard 19 which are adapted to allow the operator to modify the stored pattern information and to modify other system functions such as size and speed of printing and operation of additional ink jet discharge heads (not illustrated).

The unitary printing head 10 is connected to the mobile housing 4 by a flexible cable 16 which encases a first fluid conduit 18 which supplies ink to the unitary printing head, a second fluid conduit 20 which supplies solvent to the unitary printing head 10, a first electric conduit cable 22 which is connected indirectly to the upper cabinet 8 for providing ink jet forming signals to the head 10 and a second electric conduit cable 24 which is adapted to relay a signal to the control means upon detection of a predetermined condition by sensor 21. As will be discussed more fully below, sensor 21 may be a proximity detector which functions to determine the presence of an object such as a package moving along a conveyor adjacent to head 10. Upon receipt of such a signal from sensor 21, the control means may be programmed to cause the generation of a predetermined pattern on the package. Sensor 21 may be of a more sophisticated design which is capable of identifying the type of package for selection of one among many stored information patterns which is appropriate for the package identified.

Figure 2:
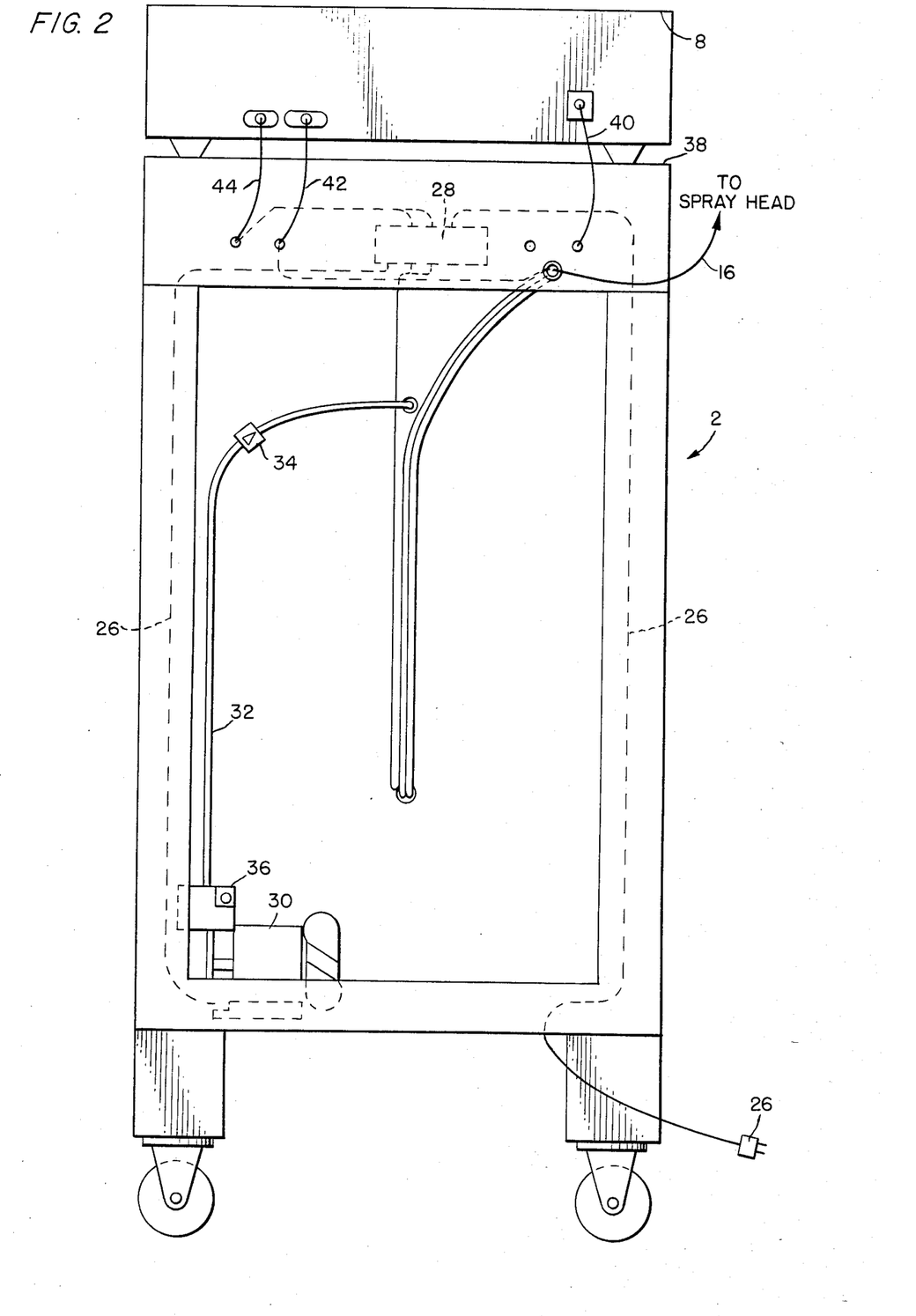
FIG. 2 is a back elevational view of the housing employed in the ink jet printer system illustrated in FIG. 1.

Reference is now made to FIG. 2 for a more detailed description of the components of the mobile housing 4 as seen from a rear view. An electric power cord 26 supplies power to the entire ink jet printing system 2 from an external source. The electric power cord 26 runs along the frame of the lower cabinet 6 into an electric fuse box 28 from which it continues to an air pump 30. The air pump 10 draws air from the ambient environment through an air filter 36. Air under pressure from the pump is supplied to the supply tanks (not illustrated) through a line 32 of one quarter inch clear tubing. The top of the lower cabinet is covered by a top plate 38 on which rests the upper cabinet 8. The microprocessor and related electrical equipment housed in the upper cabinet 8 is connected by a power cord 40 to the lower cabinet. Two signal wires 42 and 44 (connected with cables 22 and 24, respectively) run from the upper cabinet 8 into the lower cabinet 6 which runs to the remote unitary printing head 10 through flexible cable 16. By this arrangement, it is very easy to disconnect the upper cabinet from the remaining portion of the system whenever necessary such as when the control means requires repair or servicing.

Figure 3:
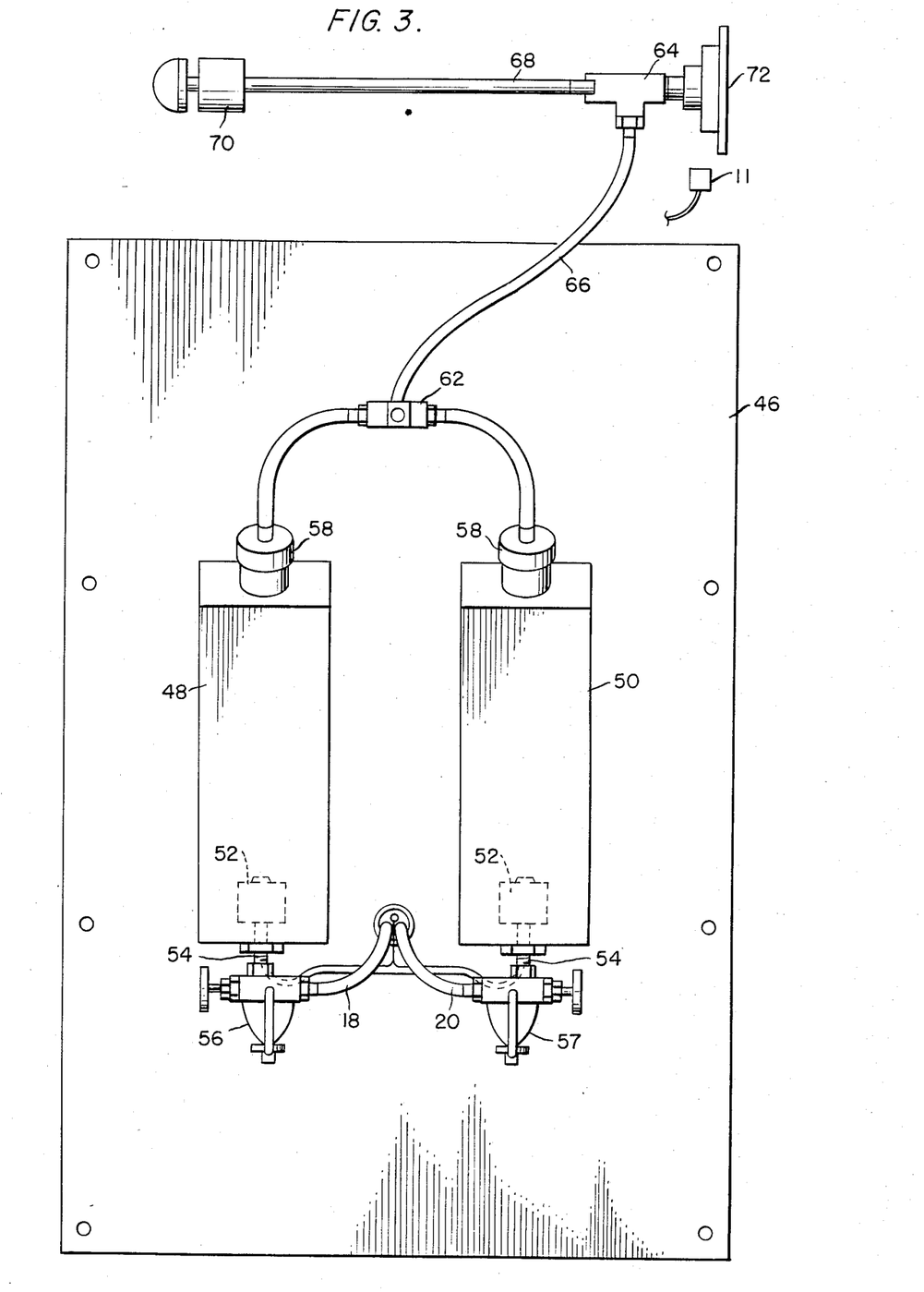
FIG. 3 is a side elevational view of the ink supply tank and solvent supply tank when mounted within the housing illustrated in FIGS. 1 and 2.

Reference is now made to FIG. 3 which illustrates a frontal view of the lower cabinet partition panel 46 after it has been removed from the back of the lower cabinet 6. Mounted onto this partition are an ink supply tank 48 and a solvent supply tank 50. Within each of these tanks is a level switch 52 which is connected on the exterior of the bottom of each tank to a closed nipple 54. Each tank is then connected to a separate filter system 56 and 57, respectively. The first fluid conduit 18 is connected to the ink filter system 56 through flexible cable 16 (FIG. 2) to the unitary printing head 10. The second fluid conduit 20 is connected to the solvent tank filter system 57 and then also passes through flexible cable 16 to the unitary printing head 10. The tops of the ink tank 48 and the solvent tank 50 are closed by tank caps 58. To each tank cap 58 is connected to a one quarter inch clear plastic tube which runs into a T connector 62 supplied with air under pressure from pump 30 through tubing 32. T connector 62 is itself connected to another T connector 64 by a further length of one-quarter inch clear plastic tube 66. One side of T connector 64 is further attached through another run of one quarter inch clear plastic tube 68 to a pressure release valve 70. The other side of T connector 64 is attached to a pressure gauge 72. Electric power for the ink jet printing system 2 pressurization is controlled by the on off switch 11.

Figure 4:
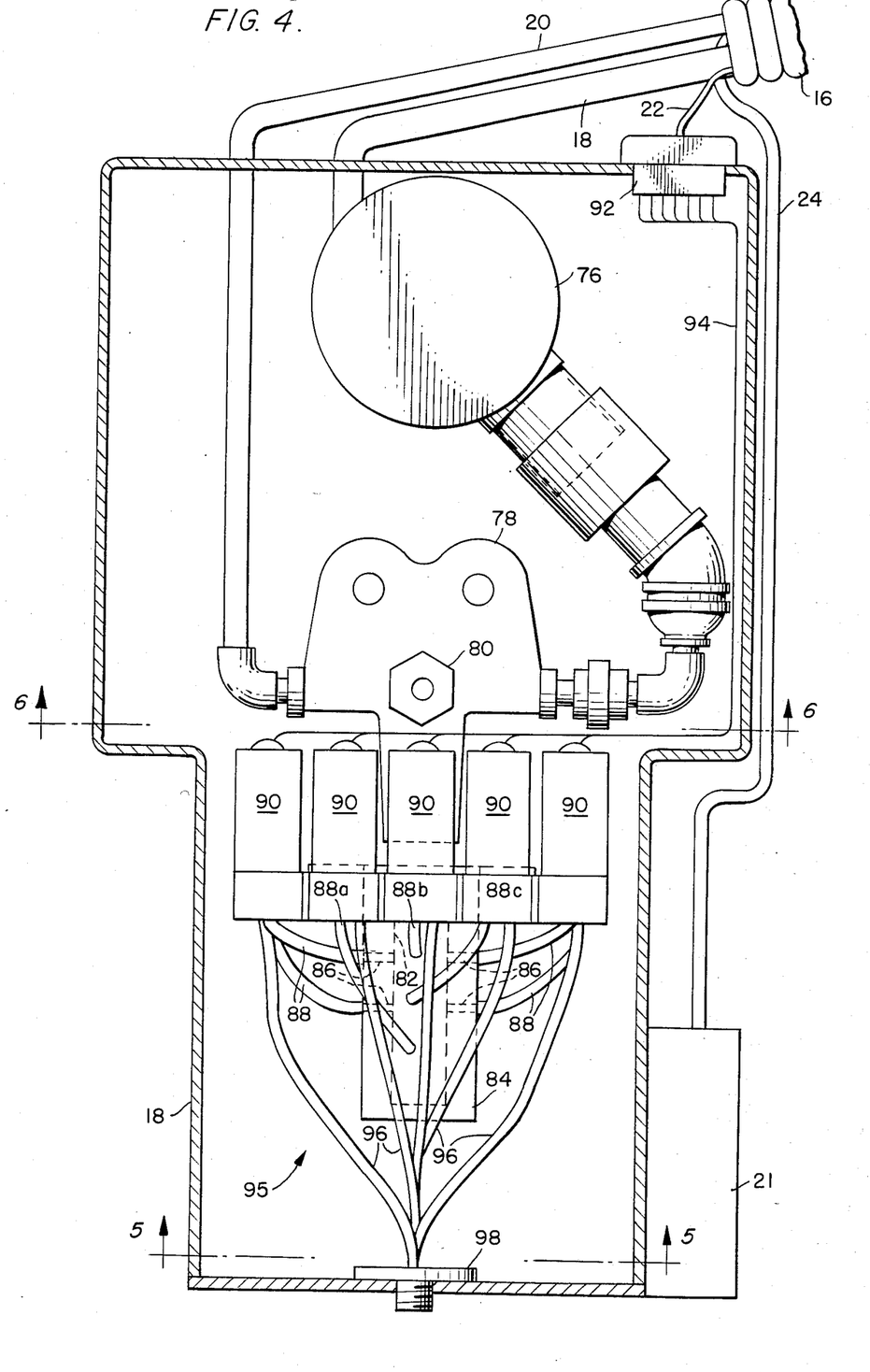
FIG. 4 is a cross sectional view of the ink jet discharge head employed in the subject invention as taken along lines 4—4 of FIG. 1.

The configuration and operation of unitary printing head 10 may be better understood by reference to FIG. 4 which provides cross sectional view of the internal components of unitary printing head 10. Ink from the first fluid conduit 18 is delivered from flexible cable 16 into the unitary printing head 10 through filter 76 which then directs the flow of ink through a series of joints and connectors into the body 78 of three way valve 80. The second fluid conduit 20 delivers solvent from flexible cable 16 into the body 78 of three way valve 80. Three way valve 80 controls the supply of either ink or solvent into the longitudinal cavity 82 contained with a supply manifold 84 by means of a manual operator which will be referred to below. The contents of the longitudinal cavity 82 are then directed through radially directed supply passages 86 formed in supply manifold 84 into supply conduits 88 which are each connected to separate control valves 90. It should be noted from FIG. 4 that two radially directed supply passages 86 are oriented toward the pair of control valves mounted on leg 102b of support 102 and that a pair of additional directed supply passages 86 are radially directed in the opposite direction toward the pair of control valves 90 mounted on leg 102a. Although not illustrated in FIG. 4, three additional supply passages are connected with supply conduits 88a, 88b and 88c for supplying ink and solvent to the control valves 90 mounted on the cross member 102c (illustrated in FIG. 5). These three additional supply passages are generally parallel to one another and are oriented perpendicularly with respect to the plane in which the remaining supply passages 86 (shown in FIG. 4) reside. The operation of the control valves 90 is controlled by signals sent through first electric conduit cable 22 which is connected through multiple connector 92 through signal wires 94 to each control valve. In response to signals transmitted to them through signal wire 94, the control valves 90 open to deliver ink through ink passage means 95 to nozzle assembly 98 for deposit on a printing surface. Ink passage means 95 is formed by a plurality of conduits 96 each of which contains an ink flow passageway which links a control valve 90 to a single ink jet orifice contained in nozzle assembly 98. The second electric conduit cable 24 is connected through flexible cable 16 to sensor 21.

Figure 5:
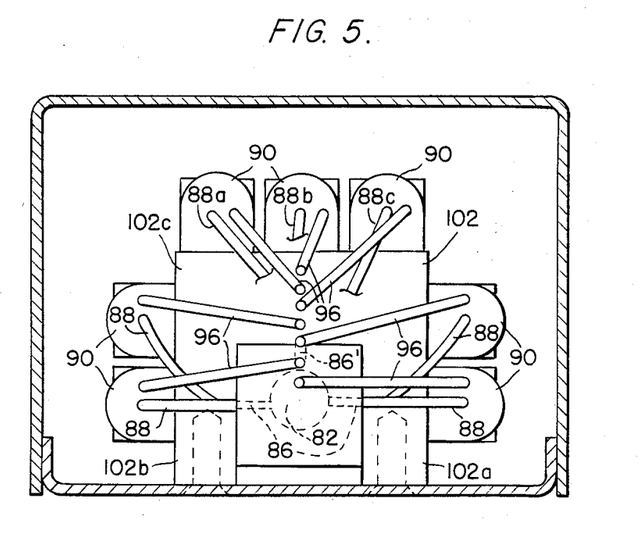
FIG. 5 is a cross sectional view of the ink jet discharge head as taken along lines 5—5 of FIG. 4.

A frontal cross sectional view of unitary printing head 10 is illustrated in FIG. 5 which shows the arrangement of ink flow passageways contained in conduits 96 which extend between control valves 90 and corresponding ink jet orifices located in the nozzle assembly (not illustrated). Note that supply conduits 88a, 88b, and 88c are only partially shown to eliminate confusion and that one of the supply passages 86' communicating with supply conduits 88a, b and c is illustrated in dashed lines. FIG. 5 also shows the U-shaped configuration of the support 102 for control valves 90 in which two control valves are mounted on each leg 102a and 102b of the support 102 and three control valves are mounted on the cross-member 102c of the support.

From a careful comparison of FIGS. 4 and 5, it can be seen that support 102 is arranged in a generally spaced, parallel position with respect to a linear pattern of ink jet orifices contained in the nozzle assembly 98. This linear pattern(described in more detail below) is arranged with respect to the U-shaped pattern of control valves 90, so that the distance, between each valve and the ink jet orifice to which it is linked, can be selected to be approximately equal for all of the linked pairs of valves and orifices. Moreover, the shape of the respective passageways contained in the conduits 96 are configured as much alike as possible to impart substantially identical ink flow characteristics to the respective passageways. By imparting such identical ink flow characteristics, it is possible to cause ink jet droplets of identical mark forming characteristics to be discharged from the ink jet orifices at a predetermined lag time following receipt of activating signals by the control valves such that the lag time between receipt of the activating signal by a control valve and the discharge of an ink droplet by a linked ink jet orifice is the same for each linked control valve and ink jet orifice. The disclosed system is thus capable of very high speed operation with resulting highly stabilized and uniform ink jet patterns being formed on the receiving print surface.

Figure 6:
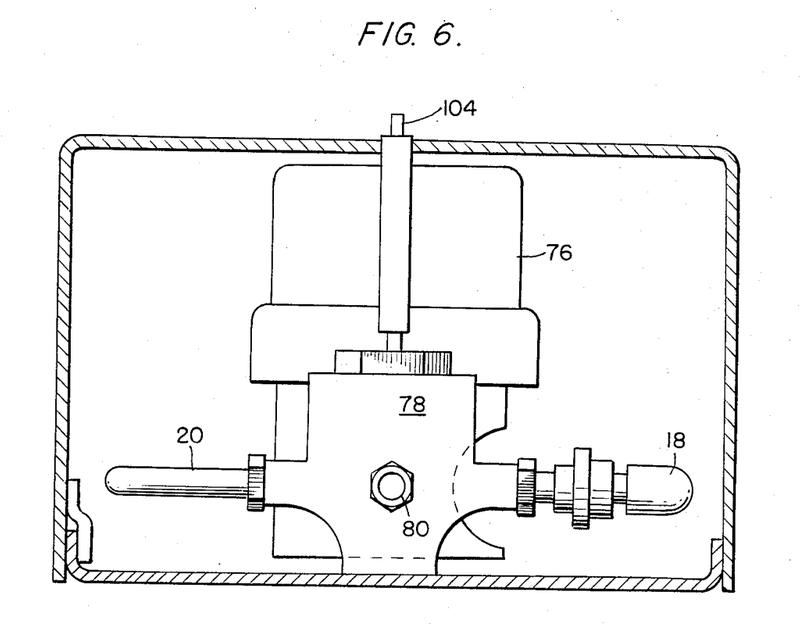
FIG. 6 is a cross sectional view of the ink jet discharge head as taken along lines 6—6 of FIG. 4.

A rear cutaway view of unitary printing head 10 is supplied by FIG. 6 which shows first fluid conduit 18 connected to one side of the body 78 of three way valve 80, whereas second fluid conduit 20 is connected to the other side of the body 78 of three way valve 80. Above the body 78 of three way valve 80 is located the filter 76 and a control knob 104 for changing the flow of ink and solvent in the three way valve 80.

Figure 7:
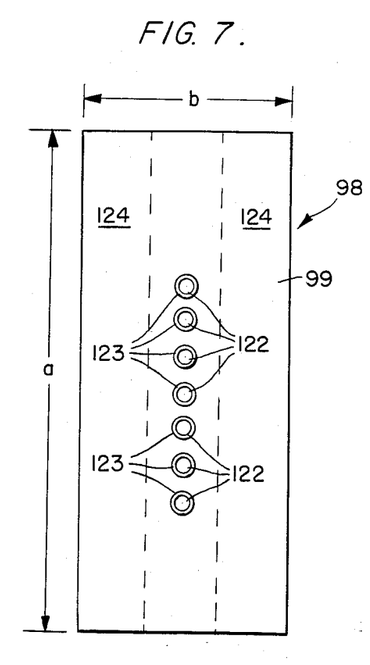
FIG. 7 is a back elevational view of the nozzle assembly employed in the ink discharge head of FIGS. 4–6.
Figure 8:
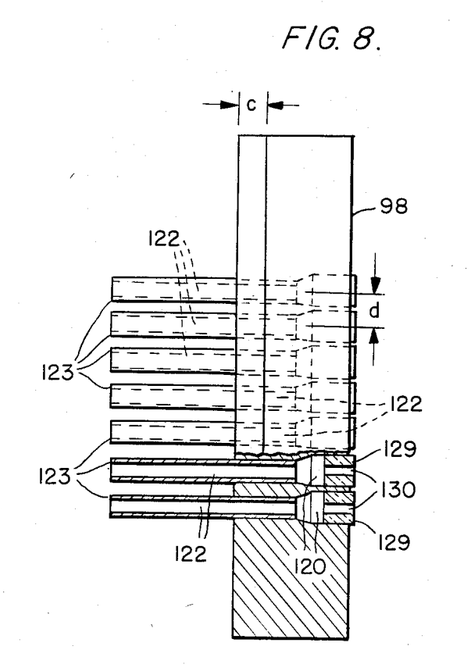
FIG. 8 is a partially broken away side elevational view of the nozzle assembly of FIG. 7.
Figure 9:
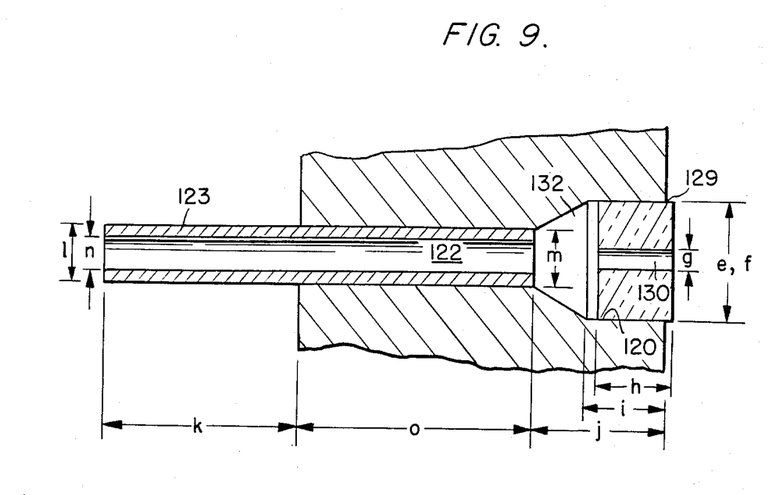
FIG. 9 is an enlarged cross sectional view of a single nozzle tube and ink jet orifice containing plug as each is mounted in the nozzle assembly of FIGS. 7 and 8.

In order to further understand the construction and functioning of nozzle assembly 98, reference is now made to FIGS. 7, 8 and 9. The following Chart I lists the critical dimensions referred to by letter in the preferred embodiment illustrated by FIGS. 7, 8 and 9.

CHART I

| Nozzle Assembly Dimensions (Inches) | |
|---|---|
| a | 2⅛ |
| b | ¾ |
| c | ⅛ |
| d | .112 |
| e (cavity) | .090 |
| f (plug) | .090 |
| g | .008 |
| h | 3/32 |
| i | 5/64 |
| j | 9/64 |
| k | 7/16 |
| l (tube) | .068 |
| m | .068 |
| n | .052 |
| o | 15/64 |

FIG. 7 shows a rear view of the nozzle assembly 98 including a nozzle body 99 and a plurality of nozzle tubes 123. Nozzle tubes 123 contain nozzle channels 122 which open into corresponding nozzle cavities 120 (FIGS. 8 and 9) aligned in a linear fashion along the center of the vertical axis of the nozzle assembly 98. Wing portions 124 are formed on each side of nozzle body 99 and are adapted to lie flush against the interior wall of unitary printing head 10.

FIG. 8 shows a partially cutaway lateral view of nozzle assembly 98. FIG. 8 also illustrates the nozzle channels 122 which communicate at one end, respectively, with the nozzle cavities 120. Mounted at the end of each cavity 120 remote from channel 122 is a plug 129 which seals the cavity 120 and forms an ink reservoir 132 (FIG. 9) in the remaining portion of the cavity 120. Plugs 129 contain the ink jet discharge orifice 130 whose diameter and length have been carefully selected, from empirical studies to be preferably 0.008 inches and 3/32 inch, respectively. A more detailed view of an individual nozzle cavity is presented in FIG. 9. From this illustration, it is apparent that the volume of reservoir 132 is substantially greater than the volume of orifice 130. This arrangement of a reservoir as close as possible to the discharge orifice 130 has been found to lead to improved ink jet printer operation, particularly with regard to improved stability and controllability in the ink jet droplet size produced by each orifice.

Figure 10:
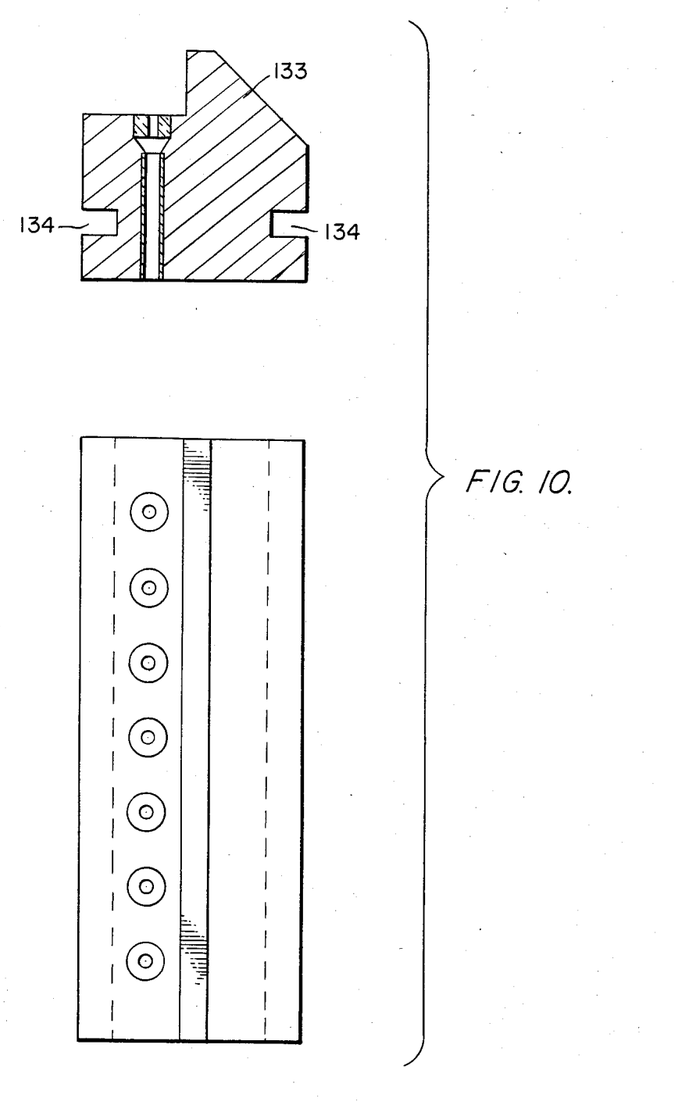
FIG. 10 is a cross-sectional view of a nozzle assembly embodying a spacing guide and mounting slots.

FIG. 10 shows a cross sectional view of a nozzle assembly which incorporates a guidance space element 133. This element assures proper spacing of container or surface to be imprinted from orifice opening. Slots 134 permit easy and accurate replacement of nozzle assemblies.

In the preferred embodiment, it has been found desirable to use for control valves 90 a valve manufactured by Lee Valves, Westbrook, Conn. identified as LFA X 0505 10AA employing an operating spring element having the following characteristics: non-magnetic, long life uniform load/compression performance over short path (1-2 mm), reactive to the operating conditions which follow. The power supply of the disclosed system is designed to provide a voltage to control valves 90 of between 11-15 volts and the microprocessor has been programmed to allow the opening time of each control valve to be varied in 9-10 steps between 2 and 4.5 milliseconds. The careful control over the shape of the passageways contained in conduits 96 and the provision of a relatively high volume reservoir adjacent each ink jet orifice has been empirically shown to be important to the attainment of reproducible control over the size and stability of the ink jet droplets emitted by orifice 130. Such control is most sensitive to the time of opening of each control valve and is less sensitive to the pressure of the ink supply (held normally to approximately 0.4 atmosphere) and to the voltage supply of the system. Preferably plugs 129 are formed of glass.

INDUSTRIAL APPLICABILITY

An ink jet printing system has been disclosed having particular utility when applied to the coding of packages moving along a conveyor. However, the disclosed system could be used anywhere that ink jet printing of high speed and controllability is desired.

We claim:

1. An ink jet discharge head for use in an ink jet printing system that projects mark-forming ink droplets onto a printing surface, comprising:
   (a) a printing head enclosure;
   (b) a nozzle body mounted to said head enclosure and containing a plurality of ink jet orifices in a single vertical linear pattern defining a discharge plane;
   (c) a support arranged in said head enclosure generally parallel to and spaced from said linear pattern of ink jet orifices;
   (d) a supply manifold at said support and containing an internal longitudinal cavity extending, from said support, a substantial portion of the distance between the discharge plane of the ink jet orifices and said support;
   (e) a plurality of signal responsive solenoid-operated control valves corresponding in number to the number of ink jet orfices; said solenoid-operated control valves being mounted on said support in an array disposed radially about the supply manifold and connected to the supply manifold by respective supply conduits, outlet openings of the control valves being disposed in a single valve plane that is parallel to the discharge plane of said ink jet orifices;
   (f) ink passage means for delivering ink to said ink jet orifices from corresponding control valves while attaining reproducible control over the size and stability of ink jet droplets emitted by each of the ink jet orifices, including a plurality of ink flow passageways having substantially identical ink flow characteristics, respectively, between the outlet openings of the control valves and inlet opening of nozzle channels that are provided in the nozzle body, and end of said nozzle channels opposite their inlet opening communicating with nozzle cavities formed within the nozzle body, and plugs, containing a respective said ink jet orifice extending therethrough, press fit into each of said nozzle cavities in a manner forming a reservoir adjacent each ink jet orifice, between an inner end of each plug and the end of the nozzle channel communicating with the nozzle cavity, the volume of each reservoir being substantially greater than the volume of the adjacent nozzle orifice, wherein the ink jet orifices have a diameter of approximately 0.008 inch and a length of approximately 3/32 inch and wherein the reservoirs have a minimum diameter of approximately 0.068 inch adjacent the nozzle channels, a maximum diameter of approximately approximately 0.09 inch adjacent the plugs and a length of approximately 0.0625 inch.

2. An ink jet discharge head according to claim 1, wherein said plugs are formed of glass.

3. An ink jet head according to claim 1, wherein said nozzle channels are formed as passages in nozzle tubes that project outwardly from the receiving channels formed in said nozzle body.

4. An ink jet head according to claim 2, wherein said nozzle channels are formed as passages in nozzle tubes that project outwardly from the receiving channels formed in said nozzle body.

5. An ink jet discharge head according to claim 1, said ink flow passageways have substantially identical lengths.

6. An ink jet discharge head as defined in claim 3, wherein said ink flow passageways are formed in respective conduits, said conduits being connected to ends of respective nozzle tubes.

* * * * *